(12) United States Patent
Jia et al.

(10) Patent No.: US 7,660,373 B2
(45) Date of Patent: Feb. 9, 2010

(54) DATA DEMODULATION FROM WEAK NAVIGATIONAL SATELLITE SIGNALS

(75) Inventors: Zhike Jia, San Jose, CA (US); Chi-Shin Wang, Half Moon Bay, CA (US)

(73) Assignee: SiRF Technology, Inc., Santa Clara, CA (US)

( * ) Notice: Subject to any disclaimer, the term of this patent is extended or adjusted under 35 U.S.C. 154(b) by 637 days.

(21) Appl. No.: 11/244,436

(22) Filed: Oct. 4, 2005

(65) Prior Publication Data
US 2007/0230543 A1    Oct. 4, 2007

(51) Int. Cl.
*H04L 27/06*    (2006.01)
(52) U.S. Cl. .................................. 375/343; 342/357.15
(58) Field of Classification Search ................. 375/148, 375/150, 343; 342/357.1, 357.15
See application file for complete search history.

(56) References Cited

U.S. PATENT DOCUMENTS

| | | | |
|---|---|---|---|
| 4,701,934 A | 10/1987 | Jasper | 375/1 |
| 4,821,294 A | 4/1989 | Thomas, Jr. | 375/96 |
| 5,192,957 A | 3/1993 | Kennedy | |
| 5,271,034 A | 12/1993 | Abaunza | |
| 5,576,715 A | 11/1996 | Litton et al. | |
| 5,768,319 A | 6/1998 | Durboraw, III | 375/316 |
| 5,966,401 A | 10/1999 | Kumar | |
| 5,982,811 A | 11/1999 | Harrison et al. | |
| 6,009,123 A * | 12/1999 | Kaku et al. | 375/265 |
| 6,125,135 A * | 9/2000 | Woo et al. | 375/130 |
| 6,392,590 B1 | 5/2002 | Kagemoto | |
| 6,407,699 B1 * | 6/2002 | Yang | 342/357.12 |
| 6,611,756 B1 | 8/2003 | Chen | |
| 6,683,923 B1 | 1/2004 | Butts, Jr. | 375/343 |
| 6,933,886 B1 * | 8/2005 | Sahai et al. | 342/357.15 |
| 2003/0086363 A1* | 5/2003 | Hernandez | 370/208 |
| 2003/0147457 A1 | 8/2003 | King et al. | 375/148 |
| 2003/0227963 A1 | 12/2003 | Dafesh | 375/149 |
| 2006/0035654 A1* | 2/2006 | Lee et al. | 455/502 |
| 2008/0133126 A1* | 6/2008 | Dupray | 701/204 |

* cited by examiner

*Primary Examiner*—David C Payne
*Assistant Examiner*—Leon-Viet Q Nguyen
(74) *Attorney, Agent, or Firm*—Pillsbury Winthrop Shaw Pittman LLP

(57) ABSTRACT

A method to determine the polarity of navigation data from weak satellite signals is disclosed. After bit edge is detected, a method in frequency domain is used to determine the present bit polarity with the help of several prior data bits which are already known, is disclosed. The impact of residual frequency can be mitigated by frequency transform. This method is especially useful in removing the data modulation in the weak signal for subsequent long coherent integrations.

14 Claims, 3 Drawing Sheets

DATA DEMODULATION FROM WEAK NAVIGATIONAL SATELLITE SIGNALS

FIELD OF THE INVENTION

The present invention relates generally to navigational signal receivers. More specifically, it relates to techniques for extraction of navigation data bit polarities from the weak navigational satellite ranging signals after bit synchronization.

BACKGROUND OF THE INVENTION

The global positioning system (GPS) is a satellite-based radio-navigation system built and operated by the United States Department of Defense. The system uses twenty-four satellites orbiting the earth at an altitude of about 11,000 miles with a period of about twelve hours. More than twenty-four satellites may be present as spares. These satellites are placed in six different orbits such that at any time a minimum of six satellites are visible at any location on the surface of the earth except in the polar region. Each satellite transmits a time and position signal referenced to an atomic clock. A typical GPS receiver locks on to this signal and extracts the data contained in it. Using signals from sufficient number of satellites, a GPS receiver can calculate its position, velocity, altitude, and time.

The GPS receivers can acquire signals in many modes. In a "hot start" mode, the receiver already has the time, its last position, and the information on satellite position (also known in the art as almanacs or ephemeris) stored in its memory. The receiver can use this stored information to determine which satellites are probably visible, and it can then lock on to those satellite signals in a short time. On the other hand, the receiver may have no prior data on its position, time, or almanacs stored. In this "cold start" mode, the receiver has to search for signals from all of the satellites present in the constellation. There are some other modes where partial information on time, position and almanacs are available and corresponding start mode is known as "warm start."

The GPS receiver has to acquire and lock on to at least four satellites in order to derive the position, velocity and time. Usually, a GPS receiver has many parallel channels, each receiving signals from a separate visible GPS satellite. The acquisition of the satellite signals involves a two-dimensional search of frequency and the PRN code phase. Each satellite transmits a unique PRN code, which repeats every millisecond. The receiver locally generates a replica frequency and a replica code phase and correlates these with the received satellite signals. The PRN code has to be searched in at least 2046 phases and the frequency search depends upon the Doppler frequency due to relative motion between the satellite and the receiver. Additional frequency variation may result due to local oscillator instability.

When the satellite signal is strong the receiver can detect the presence of a satellite signal in a short time. But when the signal is weak a long signal correlation is needed and the integration or correlation needs to be coherent which requires large computation load. The Signals may be weak due to an obstruction by foliage or buildings, or indoor operation. Special techniques are required to acquire the signal under these weak signal power conditions. One of the more widely used techniques under these conditions is known as assisted GPS (AGPS). In this method a cellular base station or server provides the ephemeris, time and data bit edge position to the GPS receiver in the cell phone so that it may acquire the satellite signal. This technique requires synchronization with the base station or server, and the service has to be provided by the cell phone operator. Consequently, it results in extra subscription charges and base station augmentation.

Due to the disadvantages with AGPS, it is desirable to be able to acquire weak GPS signals without outside assistance. Examples of this approach are disclosed in U.S. Pat. Nos. 5,271,034, 6,392,590, and 6611756. Most of these techniques, however, are not suitable when the signal is extremely weak due to the large computation involved in carrying out lengthy integrations and fast Fourier transforms (FFTs). In these techniques, the integration involves the summing of one-millisecond correlation values. A correlation value is obtained by comparing the sample values of input signal with locally available PRN code samples over a one-millisecond interval. The difference between the agreement and disagreement of the sample values is this correlation value. In the case of perfect correlation and no noise, the correlation value is equal to the number of samples in the one millisecond length, e.g., if the number of samples per code-length in one millisecond is 2046, then the perfect correlation value is 2046. But if the codes are not aligned this value may be −130 or +126 or −2. Thus, in this case the detection of the received signal can be determined easily. In the presence of noise, however, the correlation value may not be 2046, but may have a lower value, and when the signal is extremely weak it may not be able to determine the correct correlation. In these circumstances, the receiver can estimate the correlation value over several consecutive milliseconds to arrive at a reasonable value. This summing up over several milliseconds is also known as coherent integration. The coherent integration, however, requires that there are no sample reversals due to the residual carrier frequency. If there are reversals due to carrier frequency, the correlations may be carried out over non-reversed parts of the sample lengths and may be added by squaring each part. This is known as non-coherent integration. Compared to non-coherent integration, coherent integration provides better results for the same integration length. To boost the weak signal power, long time integration is necessary.

Once the satellite signal has been acquired, it is necessary to lock on to the signal by closely following the variations of the signal characteristics, which process is also known as tracking the signal. A receiver may fail to track an acquired signal due to reasons such as significant drop in the signal power, or a variation in the carrier frequency caused by satellite Doppler, local oscillator instability, or large platform dynamics.

In addition to tracking the signal by correlation with the PRN code, a GPS receiver also needs to demodulate data modulated on top of the PRN code signal at a slower bit rate. The GPS $L_1$ signal is a code division multiple access (CDMA) signal which uses direct sequence to bi-phase modulate the carrier. The principal navigational signal $L_1$ is spread by C/A code. One-millisecond correlation with corresponding pseudo-random noise (PRN) sequence is used for C/A code demodulation. In addition to the C/A code, the GPS signal also includes supplementary navigational data modulated at 50 bits/second using bi-phase shift key (BPSK) modulation. In BPSK, bits 1 and 0 are indicated by carrier phase shifts of 0 degrees and 180 degrees, respectively. This navigational data includes ephemeris and almanac data describing the satellite location, satellite health information, satellite clock bias, etc. Without this supplementary navigational information, correct user position and time cannot be determined. So it is necessary to demodulate this navigational data from received satellite signals.

After bit synchronization (i.e., after the bit edge has already been detected) the demodulation of the navigational data needs to determine bit polarity. Under weak signal reception conditions, the received signal power fluctuates with time. And in such cases, the bit polarity may not be correctly determined by known techniques, which use only information in the current data bit (i.e., 20 one-millisecond correlation values over the current data bit). There is therefore a need for improved methods for determining bit polarity.

SUMMARY OF THE INVENTION

Accordingly, in one aspect, the invention provides a method to determine the present data bit polarity based on known prior data bits after bit synchronization. In one embodiment, the data bit polarity determination is based on a frequency domain peak power component estimation method. By frequency transform, the impact of residual frequency can be mitigated. This method is especially useful in removing the data modulation for long coherent integrations.

DETAILED DESCRIPTION

Figure 1:
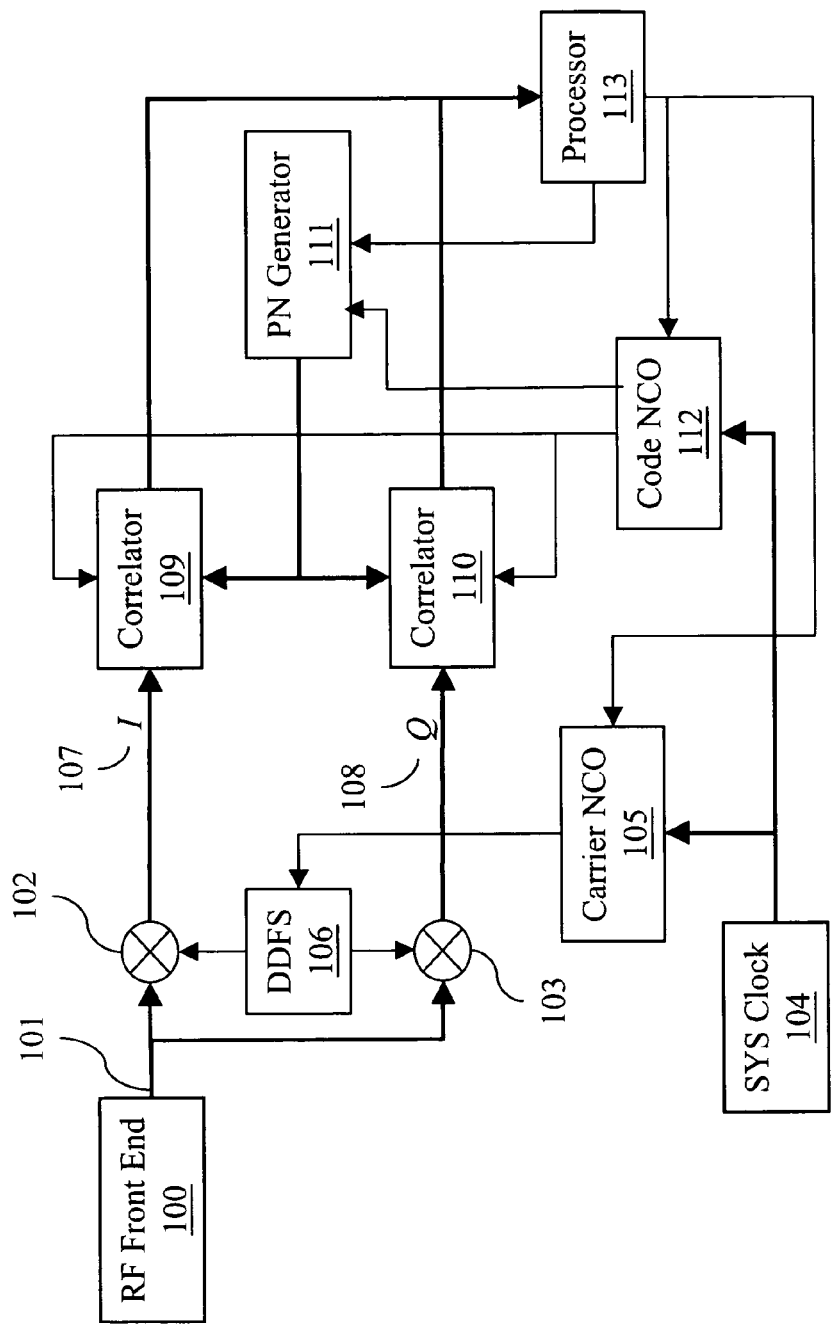
FIG. 1 is a block diagram illustrating a GPS receiver according to an embodiment of the present invention.

A preferred embodiment of a receiver according to the present invention is illustrated in FIG. 1. An intermediate frequency (IF) signal input 101 enters a baseband section of the receiver from an analog-to-digital converter (ADC) output of a conventional RF front-end 100. The IF input is multiplied in IF mixers 102 and 103 in-phase and in quadrature, respectively, with a local frequency signal generated by a direct digital frequency synthesizer (DDFS) 106. This mixing involves multiplying the ADC output 101 by the local DDFS frequency in-phase which generates the in-phase (I) component 107. In a parallel path the same signal 101 is multiplied by the DDFS frequency in quadrature (i.e., with a phase shift of 90 degrees) to produce quadrature (Q) component 108. The DDFS 106 is driven by a carrier numerically controlled oscillator (NCO) 105. In addition, carrier NCO 105 receives phase and frequency corrections from a processor 113. Because of this correction, the DDFS frequency and phase is almost the same as that of ADC output 101. Thus the I and Q signals produced by the IF mixers 102 and 103 are near zero carrier frequency. The I and Q signals may be low-pass filtered to remove the high frequency components which are equal to twice the IF frequency band.

The I and Q components 107 and 108 are correlated in correlators 109 and 110, respectively, with a locally-generated PRN sequence generated by a PRN generator 111. The PRN-sequence corresponds to the channel being processed by the baseband section at that time. The PRN sequence generator is driven by code NCO 112. The local code generator frequency is made equal to the code rate of I and Q paths by corrective feedback from processor 113 to the code NCO 112. In addition, processor 113 sends a signal to PRN code generator 111 to set the starting phase of the locally generated code. The NCO 112 provides the correct clock signals to correlators 109 and 110. For example, NCO 112 provides a clock signal to generate two samples per PRN chip in the signal acquisition stage and three samples per chip during the tracking stage. SYS CLK 104 provides to NCO 105 and NCO 112 a common clock synchronization signal. The correlator output values are then sent to processor 113 at every millisecond interval. The processor 113 may be a digital signal processor (DSP) core. Subsequent processing of the signals take place in the processor 113, as will be described in detail below. Additional details of the receiver baseband section described above are contained in U.S. patent application Ser. No. 11/123,861 filed May 6, 2005, which is incorporated herein by reference.

The DSP core 113 receives one millisecond integrated (correlated) I and Q values from the GPS baseband section described above. In order to acquire a GPS signal in the DSP processor, all dwells (set of carrier frequency, code offset) are searched. It is a two-dimensional search. Coherent integration and non-coherent integration are two commonly used integration methods to acquire GPS signals. Coherent integration provides better signal gain at the cost of larger computational load, for equal integration times.

The power associated with non-coherent integration of N milliseconds with one millisecond coherent integration is $$\text{Power} = \sum_{n=0}^{N-1} (I(n)^2 + Q(n)^2) \quad (1)$$

and the power associated with coherent integration is $$\text{Power} = \left(\sum_{n=0}^{N-1} I(n)\right)^2 + \left(\sum_{n=0}^{N-1} Q(n)\right)^2 \quad (2)$$

where I(n) and Q(n) denote the one-millisecond integration values from the baseband section at interval n, and N denotes the desired number of one-millisecond integration intervals. For coherent integration, the valid frequency bandwidth is narrowed so the frequency step is smaller than in non-coherent integration, which means that there are more frequency bins to search when using coherent integration. One method to mitigate this impact is to use an FFT method for coherent integration so that more frequency bins can be checked at a time. However, one additional parameter (i.e., bit edge) needs to be detected, especially for coherent integration over extended periods of time. Thus, when used as it is, this FFT based method results in increased computational load. A multi-step acquisition scheme consisting of coarse acquisition and fine acquisition may be employed to reduce the computational load.

Once the signal has been acquired, it is necessary to maintain the lock between the local replica signal and the input signal and also extract the navigational data bits. This means the local signal should track the frequency variations in the incoming signal with negligible carrier and local oscillator frequency difference. During this tracking stage, the navigation data bits in the received signal may be extracted. This is the process of data demodulation.

Data demodulation is comprised of two stages: the first stage is data bit edge detection, which is also called bit synchronization; the next stage is data bit polarity determination. In the present invention, we focus on the data bit polarity determination after bit synchronization.

After the navigation data bit edge has been detected using any of various techniques known in the art, the polarity of successive navigation data bits may be determined. Because in the tracking stage there is still frequency offset between local replica signal and received signal, the carrier frequency cannot be wiped off completely. Under weak signal conditions, the residual carrier frequency cannot be completely removed. This kind of residual frequency can also cause the sign change of received samples, which is mixed with the sign change due to BPSK data demodulation. If the residual frequency is large or the integration time is long, the impact of residual frequency to the data polarity determination becomes severe.

The use of frequency transform is an efficient way to detect and remove the residual carrier frequency in the process of data demodulation. In the preferred embodiment, an FFT based approach is used. An advantage of this approach is that it has a small computational load for later data bit polarity estimation. The polarity of the GPS navigation data bit is preferably determined based not only on the information of the current twenty-millisecond sequence of correlation values but also on correlation values in previous data bits. In some cases, the polarity of some prior bits may be known and the polarity of the next succeeding bit may be determined accordingly. If there is no prior knowledge on prior bit polarity, however, the initial values of previous data bit signs may be assumed to be positive. This initialization will not impact the navigation information decoding, such as ephemeris, almanac, etc., because sign ambiguity can be solved during frame synchronization.

In the GPS receiver embodiment shown in FIG. 1, the GPS baseband unit outputs one-millisecond I(n) and Q(n) correlation values which are the real and imaginary parts of the complex correlation values s(n) defined by $$s(n) = I(n) + iQ(n) \quad (3)$$

where i is the imaginary unit and n is a discrete time index. The correlation value s(n) may be equivalently represented as s(n)=s(20k+j), where k is the data bit index and j ($0° \leq j < 20$) is a millisecond index within one-bit duration. The duration of one GPS navigational data bit is 20 milliseconds. After bit synchronization, the input sample stream can be aligned to make the data bit edge located at j=0. The data bit sign B(k) for data bit k is defined by $$B(k) = \begin{cases} 1 & \text{when data bit } k \text{ is positive} \\ -1 & \text{when data bit } k \text{ is negative} \end{cases} \quad (4)$$

Now, assume that the sign of data bit m is to be determined and the signs of L prior data bits are already known. That is, the values of B(m−L), B(m−L+1), . . . , B(m−1) are known and we want to find the value of B(m). The navigation data bit polarity estimation algorithm is composed of the following three steps:

Step 1:
Using an N-point fast Fourier transform (FFT), compute the Fourier transform of 20L samples of the prior L navigation data bits, where N is the smallest power of 2 larger than 20(L+1). For example, if L=5, so 20(L+1)=120, then N can be set to $2^7$=128. To perform this FFT, firstly define a time domain signal buffer $\{s_L(n): n=0, 1, \ldots, N-1\}$ which contains samples of prior L navigation data bits multiplied by corresponding bit signs. This multiplication removes the navigation data modulation. Elements of this buffer are defined as follows:

$$s_L(n) = \begin{cases} s(20k + j)B(k) & \text{for } 0 \leq k < L; 0 \leq j < 20 \\ 0 & \text{otherwise} \end{cases} \quad (5)$$

Figure 2:
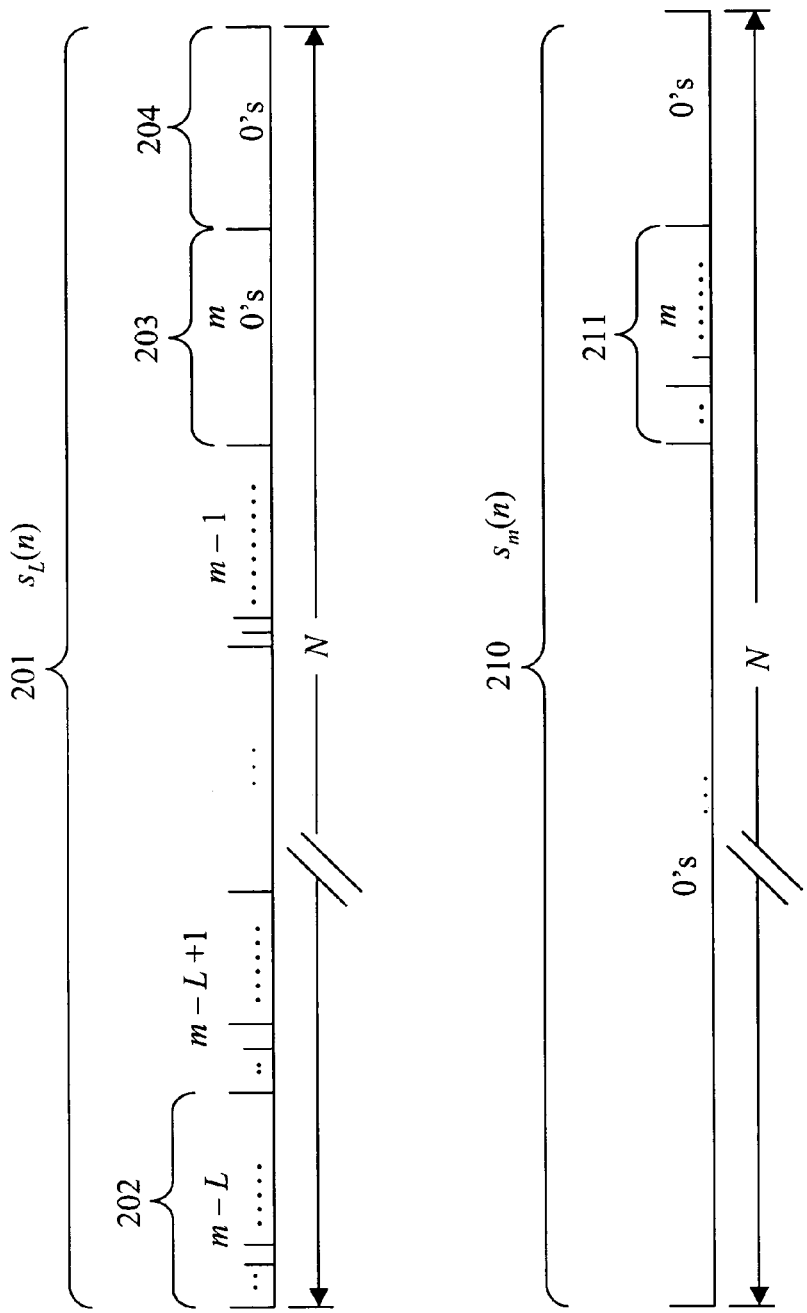
FIG. 2 illustrates an FFT based data bit polarity determination according to an embodiment of the present invention.
Figure 3:
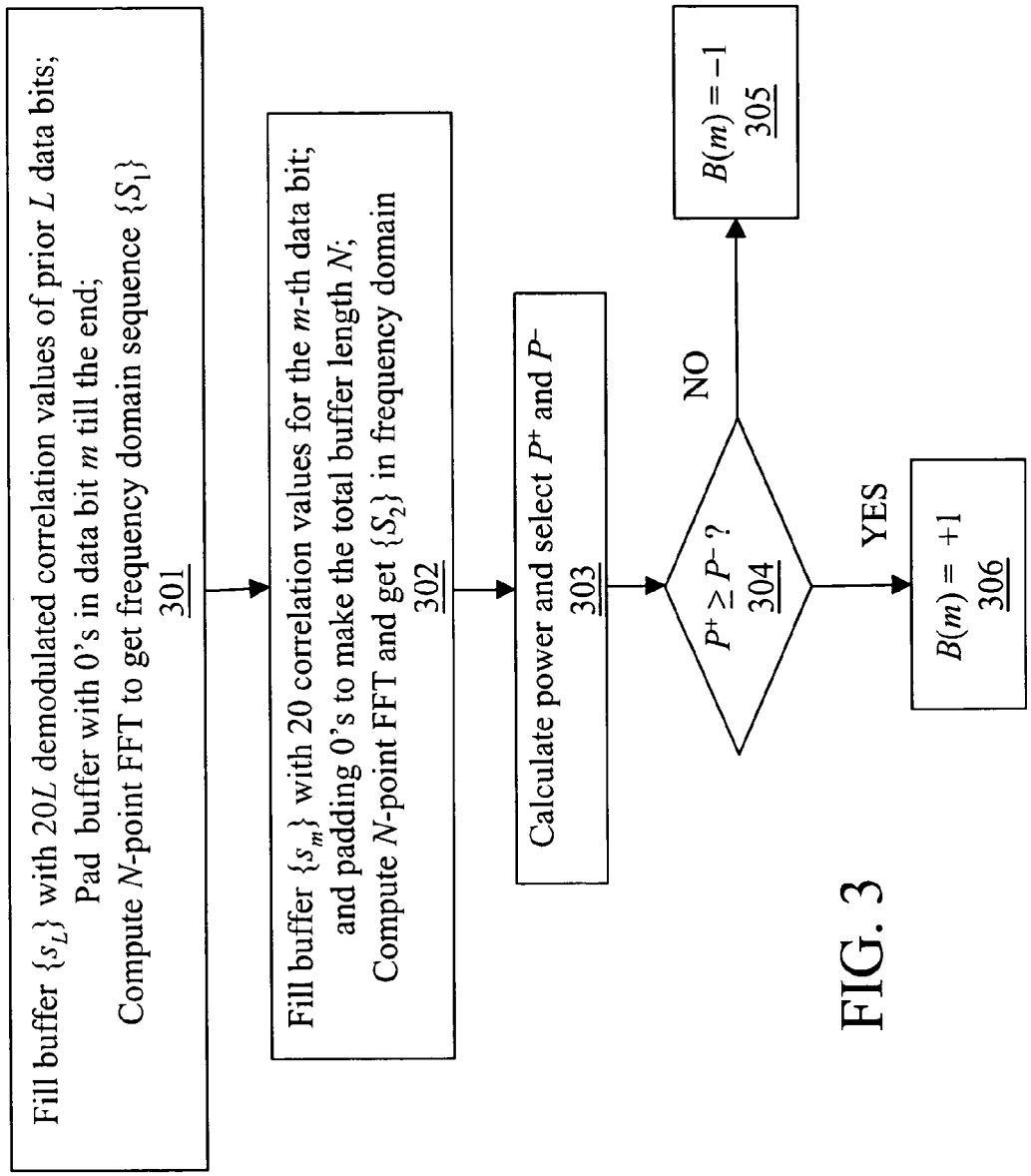
FIG. 3 is a flowchart of the FFT based data bit polarity determination according to an embodiment of the present invention.

The $s_L(n)$ data buffer is shown as 201 in FIG. 2. It contains 20L demodulated samples of the L data bits prior to bit m. The 20 samples of data bit m are shown as 203 in FIG. 2. In this step the values of theses samples are set to 0. Additional 0 padding, shown as 204 in FIG. 2, makes the total buffer length equal to N. The frequency domain signal buffer corresponding to the FFT of $s_L(n)$ is denoted as $S_1(f)$, where f is the frequency index ranging from 0 to N−1. The block 301 of FIG. 3 represents this step.

Step 2:
Compute the N-point fast Fourier transform of the 20 correlation values of data bit m. To perform this FFT, first define a signal buffer $s_m(n)$, shown as 210 of FIG. 2, in which all but the 20 correlation values 211 of data bit m are set to zero. In other words, the values of $s_m(n)$ are defined as follows:

$$s_m(n) = \begin{cases} s(20k + j) & \text{for } k = m; 0 \leq j < 20 \\ 0 & \text{otherwise} \end{cases} \quad (6)$$

The FFT of the signal sequence $s_m(n)$ is denoted as $S_2(f)$, where f is the frequency index ranging from 0 to N−1. This part has been illustrated in block 302 of FIG. 3.

Step 3:
Find the maximum power $P^+$ among the N frequency bins for $\{S_1+S_2\}$ and the maximum power $P^-$ among the N frequency bins for $\{S_1-S_2\}$. In other words, $$P^+ = \text{Max}_{0 \leq f < N}\{\text{Power}(S_1(f) + S_2(f))\} \quad (7)$$

$$P^- = \text{Max}_{0 \leq f < N}\{\text{Power}(S_1(f) - S_2(f))\} \quad (8)$$

where the Power function used to calculate the power for each frequency bin is defined by Power(S)=$|S|^2$=Real(S)$^2$+Img(S)$^2$. This part is illustrated in block 303 of FIG. 3.

If there is no carrier frequency error between the received signal and the locally generated carrier replica, the maximum power will be at the frequency bin f=0. However, the residual frequency cannot be guaranteed to be small enough when tracking weak signals. Consequently, the maximum power might be detected at a frequency bin f°≠0. By adopting FFT, all the frequency bins within 1 kHz range can be monitored one time. This provides the capability to tolerate a frequency error within 1 kHz, which is extremely important when L is large or phase lock loop (PLL) is not used in the carrier frequency tracking loop.

The current bit polarity B(m) can then be determined as follows.

$$B(m) = \begin{cases} +1 & \text{if } P^+ \geq P^- \\ -1 & \text{if } P^+ < P^- \end{cases} \quad (9)$$

This check is performed at decision block 304. If $P^{+o} > P^-$ then B(m) is set to +1 in block 306. If, on the other hand, $P^+ < P^-$ then B(m) is set to −1 in block 305.

The number of previous data bits used to determine current data bit polarity (i.e., the value of L) depends upon the signal to noise ratio and desired bit error rate. For weaker signals, a larger L may be used to achieve a given bit error rate. This in turn requires more memory and computation.

To reduce memory and computation cost, the sequence of correlation values may be down-sampled in time domain prior to conversion to frequency domain. In this embodiment, a down-sampling ratio of 5:1 can be used without sacrificing the performance. The choice of down-sampling rate is based on the computation load, amount of memory required, and the required precision in frequency estimation.

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described using the GPS system as an example, the techniques and methods may be used for other global satellite navigational systems including GLONASS, Galileo, secondary systems such as WASS, EGNOS, and MSAS, as well as hybrids of the above systems and also to any type direct sequence spread spectrum receivers. Accordingly, it is intended that the appended claims be interpreted as covering all alterations and modifications as fall within the spirit and scope of the invention.

The invention claimed is:

1. A method implemented in a global satellite navigation receiver for navigation data bit polarity determination, the method comprising:
    removing data bit signs of a received correlation value sequence of known data bit polarity to produce a corrected sequence without navigation data modulation;
    forming a first buffer sequence by padding the corrected sequence wit 0's such that the first buffer sequence has a length N equal to a power of two;
    converting the first buffer sequence to frequency domain to obtain a first transformed sequence;
    forming a second buffer sequence of length N containing correlation values within a current data bit of unknown bit polarity and 0's elsewhere;
    converting the second buffer sequence to frequency domain to obtain a second transformed sequence;
    determining a data bit polarity from a comparison of a maximum power value in a summation of the first and second transformed sequences and a maximum power value in a difference of the first and second transformed sequences.

2. The method of claim 1 wherein determining the data bit polarity comprises setting the data bit polarity to +1 if the maximum power value in the summation of the first and second transformed sequences is larger than the maximum power value in the difference of the first and second transformed sequences.

3. The method of claim 1 wherein a number of previous known data bits in the corrected sequence is selected based upon the signal-to-noise ratio of the received signal.

4. The method of claim 1 wherein a number of previous known data bits in the corrected sequence is selected based upon the probability of false bit polarity determination.

5. The method of claim 1 further comprising down-sampling the received correlation value sequence prior to the conversion to frequency domain.

6. The method of claim 5 wherein the down-sampling ratio is a fraction of a computation load, an amount of memory required, and a required precision in frequency estimation.

7. The method of claim 1 wherein converting the first buffer sequence to frequency domain comprises using a fast Fourier transform.

8. A global satellite navigation receiver device comprising an RF front end for receiving signals from navigation satellites, a baseband section receiving IF signals from the RF front end and generating one-millisecond correlation values, and a processor receiving correlation values from the baseband section, wherein the processor performs navigation data bit polarity determination by:
    removing data bit signs of a received correlation value sequence of known data bit polarity to produce a corrected sequence without navigation data modulation;
    forming a first buffer sequence by padding the corrected sequence with 0's such that the first buffer sequence has a length N equal to a power of two;
    converting the first buffer sequence to frequency domain to obtain a first transformed sequence;
    forming a second buffer sequence of length N containing correlation values within a current data bit of unknown bit polarity and 0's elsewhere;
    converting the second buffer sequence to frequency domain to obtain a second transformed sequence;
    determining a data bit polarity from a comparison of a maximum power value in a summation of the first and second transformed sequences and a maximum power value in a difference of the first and second transformed sequences.

9. The device of claim 8 wherein determining the data bit polarity comprises setting the data bit polarity to +1 if the maximum power value in the summation of the first and second transformed sequences is larger than the maximum power value in the difference of the first and second transformed sequences.

10. The device of claim 8 wherein a number of previous known data bits in the corrected sequence is selected based upon the signal-to-noise ratio of the received signal.

11. The device of claim 8 wherein a number of previous known data bits in the corrected sequence is selected based upon the probability of false bit polarity determination.

12. The device of claim 8 wherein the navigation data bit polarity determination further comprises down-sampling the received correlation value sequence prior to the conversion to frequency domain.

13. The device of claim 12 wherein the down-sampling ratio is a function of a computation load, an amount of memory required, and a required precision in frequency estimation.

14. The device of claim 8 wherein convening the first buffer sequence to frequency domain comprises using a fast Fourier transform.

* * * * *